(12) United States Patent
Luttringer et al.

(10) Patent No.: US 7,435,270 B2
(45) Date of Patent: Oct. 14, 2008

(54) PIGMENT/DYE MIXTURES

(75) Inventors: Jean Pierre Luttringer, Rixheim (FR); Rainer Hildebrand, Lörrach (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 10/553,543

(22) PCT Filed: Apr. 14, 2004

(86) PCT No.: PCT/EP2004/050515
§ 371 (c)(1), (2), (4) Date: Oct. 19, 2005

(87) PCT Pub. No.: WO2004/094532
PCT Pub. Date: Nov. 4, 2004

(65) Prior Publication Data
US 2006/0225227 A1    Oct. 12, 2006

(30) Foreign Application Priority Data
Apr. 22, 2003    (EP)    ................................. 03405280

(51) Int. Cl.
*D06P 1/00*    (2006.01)
*C09B 67/00*    (2006.01)
(52) U.S. Cl. ................ 8/637.1; 8/636; 8/685; 8/686; 8/920; 556/34; 524/90; 524/176
(58) Field of Classification Search ............... 8/643, 8/506, 636, 637.1, 685, 686, 920; 524/90, 524/176; 556/34
See application file for complete search history.

(56) References Cited
U.S. PATENT DOCUMENTS

| 4,265,632 | A | 5/1981 | Papenfuhs et al. ............. 8/512 |
| 6,893,472 | B2 | 5/2005 | Hildebrand et al. ............ 8/643 |
| 6,923,836 | B2 | 8/2005 | Hildebrand et al. ............ 8/643 |
| 6,964,689 | B2 | 11/2005 | Sutter et al. .................... 8/643 |
| 2004/0049862 | A1 | 3/2004 | Sieber ........................... 8/463 |
| 2004/0049864 | A1 | 3/2004 | Sieber ........................ 8/637.1 |

FOREIGN PATENT DOCUMENTS

| DE | 274357 | 5/1914 |
| WO | 02/051924 | 7/2002 |
| WO | 02/051941 | 7/2002 |
| WO | 02/051942 | 7/2002 |
| WO | 02/055786 | 7/2002 |
| WO | 02/057537 | 7/2002 |
| WO | WO 02/051924 | * 7/2002 |
| WO | WO 02/051942 | * 7/2002 |
| WO | WO 02/055786 | * 7/2002 |
| WO | WO 02/057536 | * 7/2002 |

* cited by examiner

*Primary Examiner*—Lorna M. Douyon
*Assistant Examiner*—Tri V Nguyen

(57) ABSTRACT

A composition comprising (A) at least one nickel complex pigment and (B) at least one disperse dye of formula (1) or (2) wherein $R_1$ is hydrogen, hydroxy or a radical —NHCO—$R_6$ wherein $R_6$ is $C_1$-$C_6$alkyl or unsubstituted or $C_1$-$C_4$alkyl- or halo-substituted phenyl, $R_2$ is hydrogen, hydroxy or a radical W—$R_7$ wherein W is —NHCO— or —S— and $R_7$ is $C_1$-$C_6$alkyl or unsubstituted or $C_1$-$C_4$alkyl- or halo-substituted phenyl, $R_3$ is hydrogen, $R_4$ is hydrogen or hydroxy, $R_5$ is hydrogen, or $R_3$ and $R_4$ together form the radical of formula wherein the rings A and B, independently of one another, may carry further substituents, $R_8$ is hydrogen or —CO—$C_2$-$C_6$alkyl wherein the $C_2$-$C_6$alkyl radical may be substituted by carboxy, or a radical wherein $R_{11}$ is hydrogen, $C_1$-$C_4$alkyl, hydroxy, carboxy or halogen, $R_{12}$ is hydrogen, $C_1$-$C_4$alkyl or halogen and $R_{13}$ is hydrogen or $C_2$-$C_3$alkyl or, when $R_{10}$ is halogen, $R_{13}$ may be methyl, $R_9$ is hydrogen or halogen, $R_{10}$ is hydrogen or halogen, and n is a number 0, 1 or 2, with the proviso that $R_9$, $R_{10}$, $R_{11}$, $R_{12}$, and $R_{13}$ are not all simultaneously hydrogen, is suitable for the dyeing or printing of semi-synthetic or synthetic hydrophobic fiber materials and in the production of colored plastics or polymeric color particles.

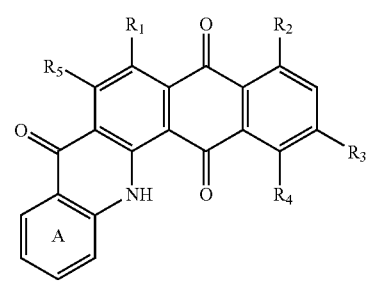

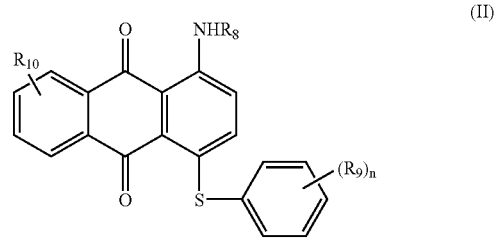

5 Claims, No Drawings

PIGMENT/DYE MIXTURES

The present invention relates to a composition comprising a nickel complex pigment and a disperse dye and to the use of such a composition in the dyeing or printing of hydrophobic fibre materials and in the production of coloured plastics or polymeric colour particles.

The use of nickel complex pigments as disperse dyes in the dyeing of polyester fibres is known, for example, from WO 02/057537 and WO 021055786. The dyeings thereby obtained are distinguished by good general fastness properties, especially a high level of fastness to light and to wetting.

Surprisingly it has now been found that a considerable further improvement in those good properties can be obtained by the addition of specific disperse dyes.

The present invention relates to a composition comprising
(A) at least one nickel complex pigment and
(B) at least one disperse dye of formula (1) or (2)

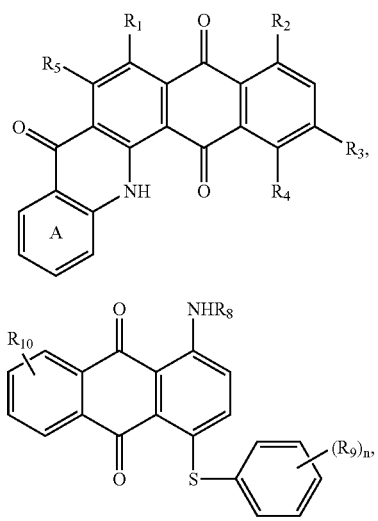

wherein $R_1$ is hydrogen, hydroxy or a radical —NHCO—$R_6$ wherein $R_6$ is $C_1$-$C_6$alkyl or unsubstituted or $C_1$-$C_4$alkyl- or halo-substituted phenyl, $R_2$ is hydrogen, hydroxy or a radical W—$R_7$ wherein W is —NHCO— or —S— and $R_7$ is $C_1$-$C_6$alkyl or unsubstituted or $C_1$-$C_4$alkyl- or halo-substituted phenyl, $R_3$ is hydrogen, $R_4$ is hydrogen or hydroxy, $R_5$ is hydrogen, or $R_3$ and $R_4$ together form the radical of formula

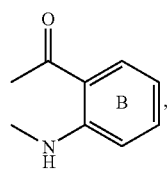

wherein the rings A and B, independently of one another, may carry further substituents, $R_8$ is hydrogen or —CO—$C_2$-$C_6$alkyl wherein the $C_2$-$C_6$alkyl radical may be substituted by carboxy, or a radical

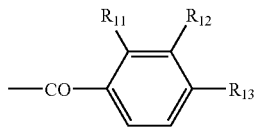

wherein $R_{11}$, is hydrogen, $C_1$-$C_4$alkyl, hydroxy, carboxy or halogen, $R_{12}$ is hydrogen, $C_1$-$C_4$alkyl or halogen and $R_{13}$ is hydrogen or $C_2$-$C_3$alkyl or, when $R_{10}$ is halogen, $R_{13}$ may be methyl, $R_9$ is hydrogen or halogen, $R_{10}$ Is hydrogen or halogen, and n is a number 0, 1 or 2, with the proviso that $R_9$, $R_{10}$, $R_{11}$, $R_{12}$ and $R_{13}$ are not all simultaneously hydrogen.

The compositions according to the invention preferably comprise as nickel complex pigment (A) a compound of formula (3)

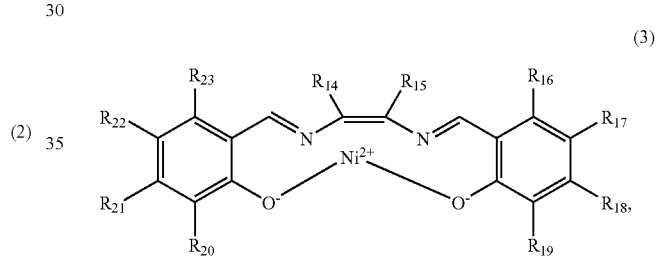

wherein $R_{14}$ and $R_{15}$ are each independently of the other CN or halogen or together with the carbon atoms to which they are bonded form an aromatic ring that is unsubstituted or substituted by one or more nitro, cyano, hydroxy, $C_1$-$C_6$alkyl, amino or $C_1$-$C_6$alkylamino groups or halogen atoms and $R_{16}$ to $R_{23}$ are each independently of the others hydrogen, halogen, —$NO_2$, —CN, —OH, —COOH, —$CH_3$, —$NH_2$ or —$NHCH_3$.

An alkyl group as a substituent $R_6$, $R_7$, $R_{11}$, $R_{12}$, $R_{13}$, as part of a —CO-alkyl group $R_8$ or as a substituent of any aromatic rings which may be present is, for example, methyl, ethyl, propyl, isopropyl, n-butyl, isobutyl, sec-butyl, tert-butyl, amyl, tert-amyl (1,1-dimethylpropyl), 1,1,3,3-tetramethylbutyl, hexyl, 2-methylpentyl, neopentyl, cyclopentyl, cyclohexyl, or a corresponding isomer.

Halogen is iodine, bromine or especially chlorine.

Among the optional substituents of rings A and B, special mention should be made of halogen, $C_1$-$C_4$alkyl and $C_1$-$C_4$alkoxy. One or more such substituents may be present.

Preferred nickel complex pigments of formula (3) are the compounds of formulae (3a) and (3b)

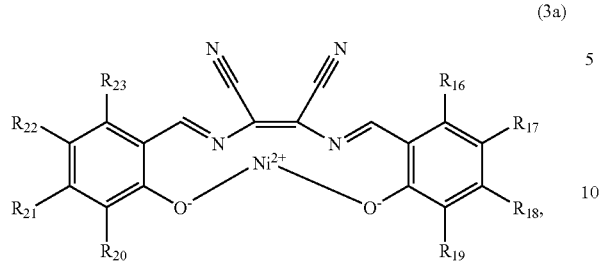
(3a)

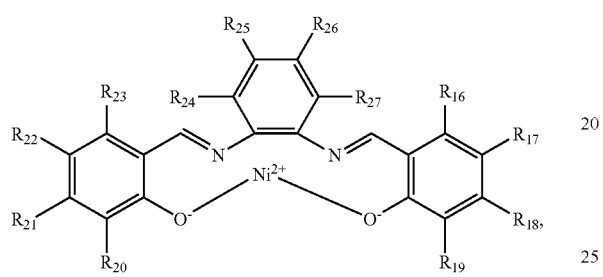
(3b)

wherein $R_{16}$ to $R_{23}$ are as defined in claim 2 and $R_{24}$ to $R_{27}$ are each independently of the others hydrogen, halogen, —$NO_2$, —CN, —OH, —COOH, —$CH_3$, —$NH_2$ or —$NHCH_3$.

Special preference is given to compounds of formula (3a) wherein $R_{16}$ to $R_{23}$ are hydrogen and to compounds of formula (3b) wherein $R_{16}$ to $R_{27}$ are hydrogen.

Of the disperse dyes of formula (1), preference is given to the blue dyes of formulae (1a)-(1e)

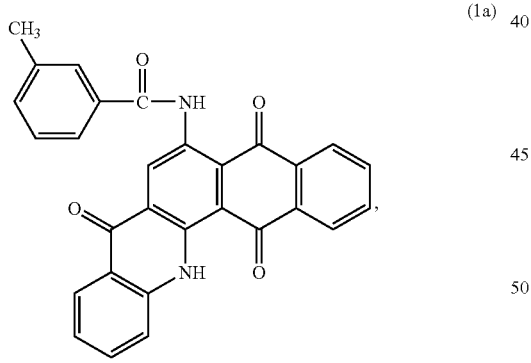
(1a)

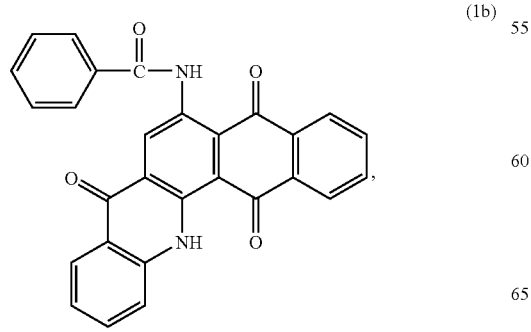
(1b)

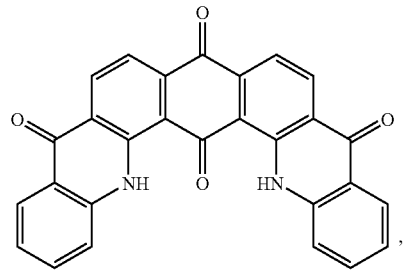
(1c)

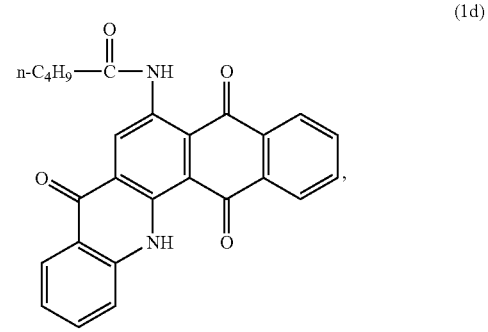
(1d)

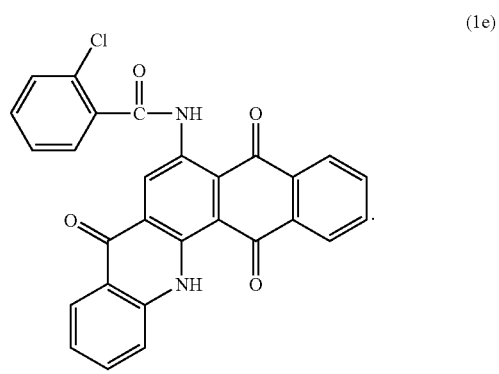
(1e)

Also preferred among the disperse dyes of formula (2) are the compounds of formulae (2a)-(2k)

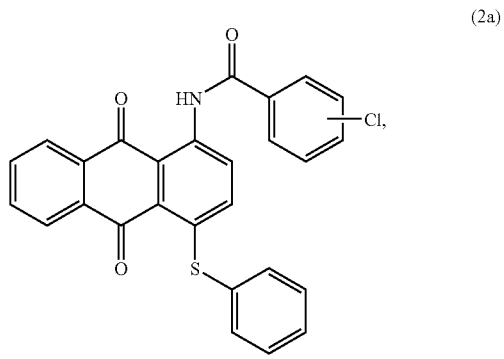
(2a)

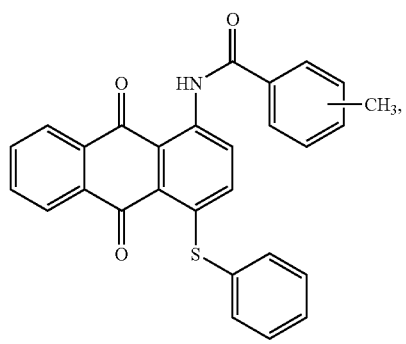
(2b)
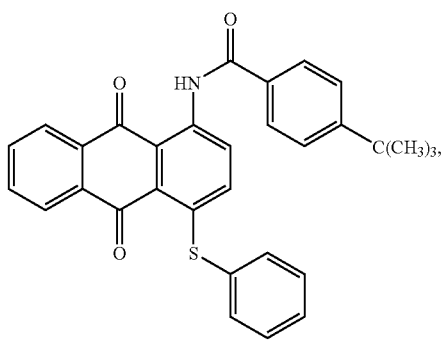
(2f)
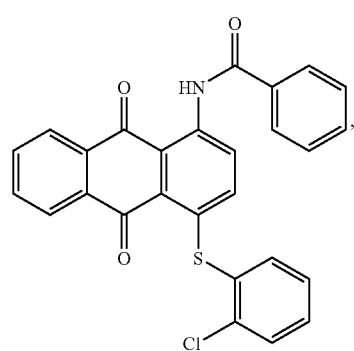
(2c)
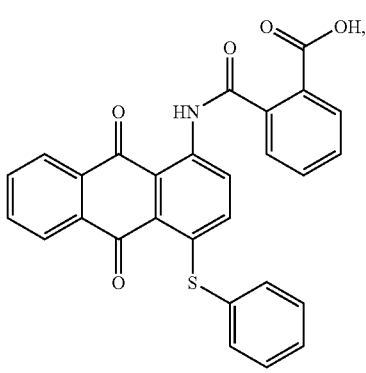
(2g)
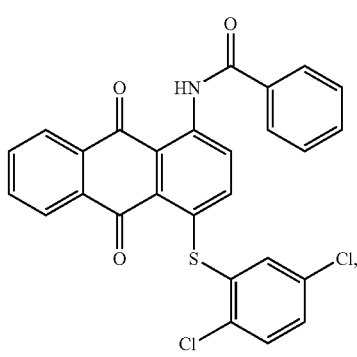
(2d)
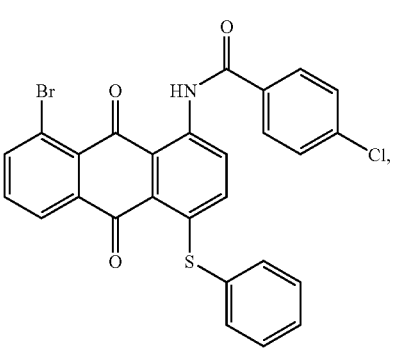
(2h)
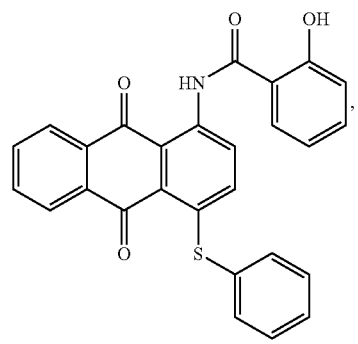
(2e)
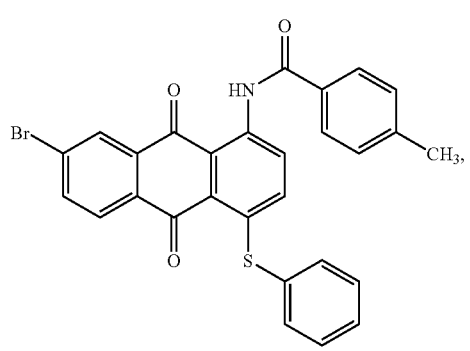
(2i)

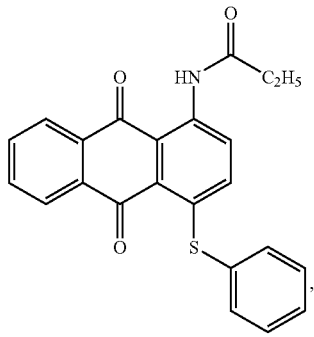
(2j)

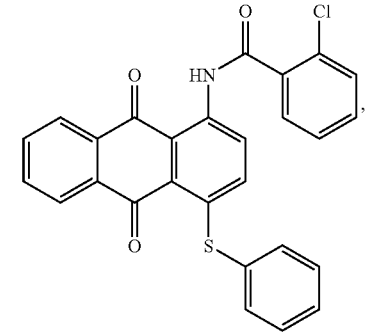
(2k)

Especially preferred disperse dyes (B) are the compounds of formulae (1a) and (2a).

The anthraquinone dye of formula (2a) is preferably used in the form of a mixture of the isomeric compounds (2a1), (2a2) and (2a3):

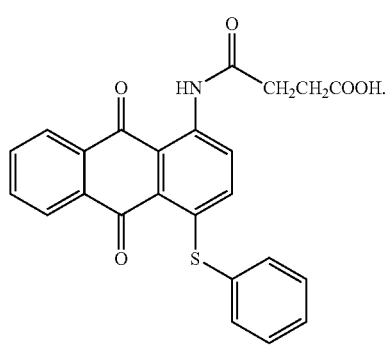
(2a1)

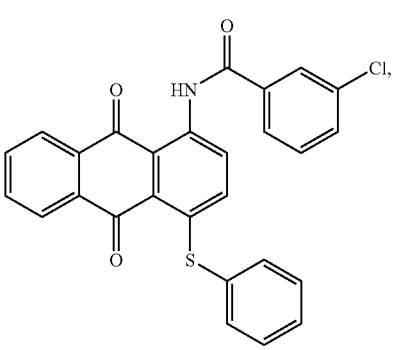
(2a2)

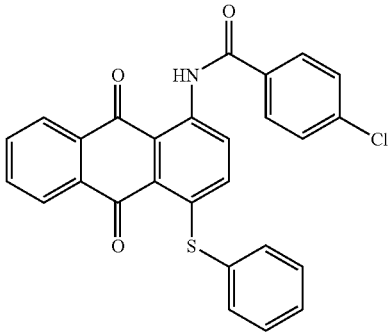
(2a3)

In that case the isomeric compounds (2a1), (2a2) and (2a3) are preferably present in approximately equal amounts.

The nickel complex pigments (A) used according to the invention are known and are described, for example, in WO 02/057537 and WO 02/055786.

The disperse dyes (B) are also known, for example from WO 02/051924 and WO 02/051942.

In a further embodiment, the compositions according to the invention comprise additionally (c) a pigment of formula (4) or (5)

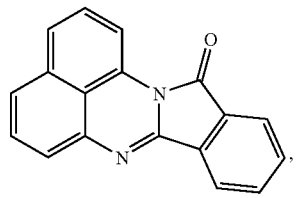
(4)

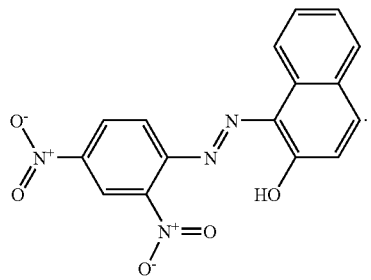
(5)

The disperse dyes of formulae (1) and (2) are suitable also for the production of mixed shades together with other dyes and especially together with a suitable yellow dye for trichromatic dyeing.

Trichromatic dyeing is to be understood as being the additive colour mixing of suitably selected yellow- or orange-dyeing, red-dyeing and blue-dyeing dyes with which any desired shade of the visible colour spectrum can be achieved by an appropriate choice of the relative proportions of the dye components.

Since the compositions according to the invention can be used both in mass colouring and in the exhaust process or thermosol process, metamerism effects can be avoided.

The invention therefore relates also to compositions comprising as disperse dye (B) a trichromatic mixture comprising at least one blue-dyeing dye of the above formulae (1a)-(1e), at least one red-dyeing dye of the above formulae (2a)-(2k) and the yellow-dyeing dye of formula (6)

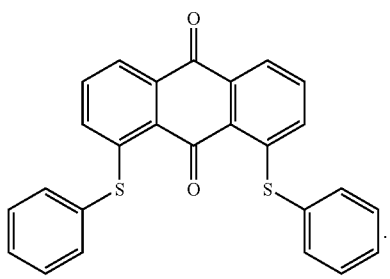

(6)

The dye of formula (6) has been known for a long time (C.I. Solvent Yellow 163) and is commercially available.

Special preference is given to trichromatic mixtures comprising the blue-dyeing dye of formula (1a), the red-dyeing dye of formula (2a) and the yellow-dyeing dye of formula (6)

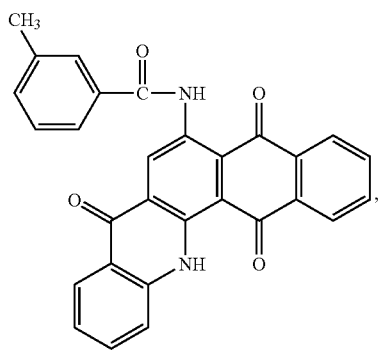

(1a)

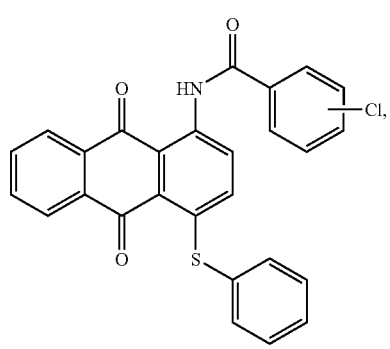

(2a)

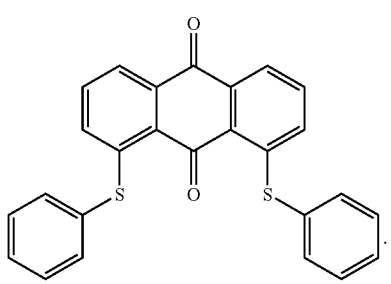

(6)

The dye mixtures according to the invention can be used in the dyeing and printing of semi-synthetic and, especially, synthetic hydrophobic fibre materials, more especially textile materials. Textile materials composed of blends comprising such semi-synthetic and/or synthetic hydrophobic textile materials can likewise be dyed or printed using the dye mixtures according to the invention.

Semi-synthetic textile materials that come into consideration are especially cellulose 2½ acetate and cellulose triacetate.

Synthetic hydrophobic textile materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the dye mixtures according to the invention to the textile materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose 2½ acetate is dyed preferably at about from 65 to 85° C. and cellulose triacetate at temperatures of up to 115° C. The dye mixtures according to the invention can also be used satisfactorily in the dyeing of polyester blends, for example polyester/cellulosic fibre blends.

The dye mixtures according to the invention are suitable for dyeing in accordance with the thermosol process, in the exhaust and continuous process and for printing processes. The exhaust process is preferred. The liquor ratio is dependent upon the nature of the apparatus, the substrate and the form of make-up. It may, however, be selected within a wide range, e.g. from 1:4 to 1:100, but is preferably from 1:6 to 1:25.

The said textile material can be in a variety of processing forms, e.g. in the form of fibres, yarns or non-wovens, in the form of woven fabrics or knitted fabrics.

It is advantageous to convert the dye mixtures according to the invention into a dye preparation prior to use. For this purpose, the dyes are ground so that their particle size is on average from 0.1 to 10 microns. The grinding can be carried out in the presence of dispersants. For example, the dried dye is ground with a dispersant or is kneaded into paste form with a dispersant and then dried in vacuo or by atomisation. The preparations so obtained can be used, after the addition of water, to prepare printing pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The dye mixtures according to the invention impart to the mentioned materials, especially to polyester material, level colour shades having very good in-use fastness properties, such as, especially, good fastness to light, more especially very good high-temperature light fastness, as well as a high level of fastness to wetting, such as fastness to water, perspiration and washing.

Especially high light-fastness properties can be achieved when the dye mixtures according to the invention additionally comprise UV absorbers.

The present invention relates also to the use of the compositions according to the invention in the production of coloured plastics or polymeric colour particles. The process for the production of coloured plastics or polymeric colour particles comprises mixing together a high molecular weight organic material and a tinctorially effective amount of a dye composition according to the invention.

The colouring of high molecular weight organic substances with the dye composition is carried out, for example, by mixing the dye composition into those substrates using roll mills, mixing apparatus or grinding apparatus, with the result that the dye composition is dissolved or finely dispersed in the high molecular weight material. The high molecular weight organic material with the admixed dye composition is then processed using methods known per se, for example calendering, compression moulding, extrusion, coating, spinning, casting or injection moulding, whereby the coloured material acquires its final form. It is also possible for the admixing of the dye composition to be carried out immediately prior to the actual processing step, e.g. by continuously feeding a dye composition in powder form and, at the same time, a granulated or pulverulent high molecular weight organic material, and optionally also additional ingredients, e.g. additives, directly into the intake zone of an extruder, where mixing takes place just before processing. In general, however, it is preferable for the dye composition to be mixed into the high molecular weight organic material beforehand, because more even colouration of the substrates can be obtained.

It is often desirable, in order to produce non-rigid mouldings or to reduce their brittleness, to incorporate so-called plasticisers into the high molecular weight compounds prior to shaping. There may be used as plasticisers, for example, esters of phosphoric acid, phthalic acid or sebacic acid. In the process according to the invention the plasticisers may be incorporated into the polymers before or after the incorporation of the colorant. It is also possible, in order to achieve different shades of colour, to add to the high molecular weight organic materials, in addition to the dye composition according to the invention, also further dyes or other colorants in any desired amounts, optionally together with further additives, e.g. fillers or siccatives.

Preference is given to the colouring of thermoplastic plastics, especially in the form of fibres. Preferred high molecular weight organic materials suitable for being coloured in accordance with the invention are very generally polymers having a dielectric constant of $\geq 2.5$, especially polyester, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Polyester and polyamide are especially preferred. Very special preference is given to linear aromatic polyesters obtainable by polycondensation of terephthalic acid and glycols, especially ethylene glycol, or condensation products of terephthalic acid and 1,4-bis(hydroxymethyl)cyclohexane, for example polyethylene terephthalate (PET), polytrimethylene terephthalate (PTT) or polybutylene terephthalate (PBTP); also polycarbonates, e.g. those of α,α-dimethyl-4,4-dihydroxy-diphenylmethane and phosgene, or polymers based on polyvinyl chloride and on polyamide, e.g. polyamide 6 or polyamide 6.6.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimeters.

EXAMPLE 1

100 g of polyester fabric are immersed at room temperature in a liquor containing
0.0037 g of the dye of formula (2a),
0.169 g of the dye of formula (1a),
0.561 g of the nickel complex pigment of formula (3b1),

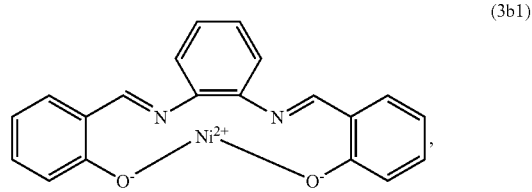

(3b1)

1 g of ammonium sulfate and
0.5 g/l of a commercially available dispersant,
in 1000 ml of deionised water,
which has been adjusted to a pH of 4.0-5.0 with 80% formic acid. The liquor is then initially heated to 135° C. at a rate of 1° C./minute. After 30 minutes at 135° C., the liquor is cooled to 40° C., the dyed polyester fabric is washed with water and subjected to reduction clearing for 20 minutes at 70-80° C. in a bath containing 5 ml/l of 30% sodium hydroxide solution, 2 g/l of 85% sodium dithionite solution and 1 g/l of a commercially available detergent. The finished dyeing is then washed with water and dried.

The resulting mid-grey dyeing has excellent light fastness and very good dry and wet fastness.

What is claimed is:
1. A composition comprising
(A) a nickel complex pigment of formula (3b1)

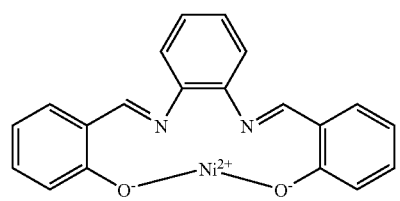

and
(B) a disperse dye of formula (1a)

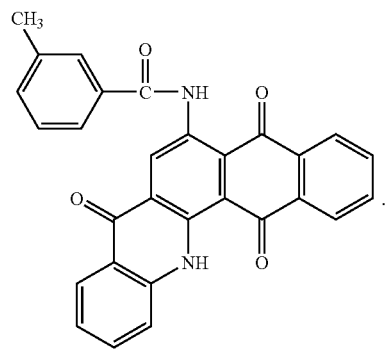

2. A composition according to claim 1, comprising additionally
(c) a pigment of formula (4) or (5)
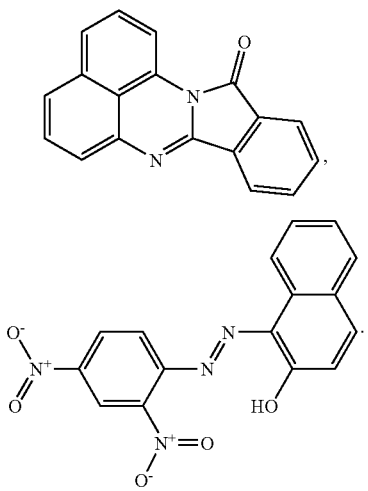
(4)
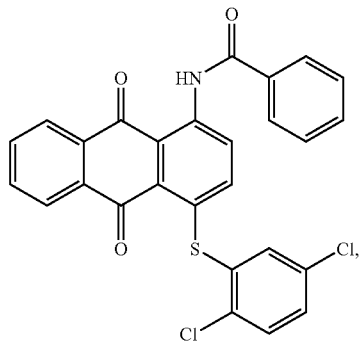
(2d)
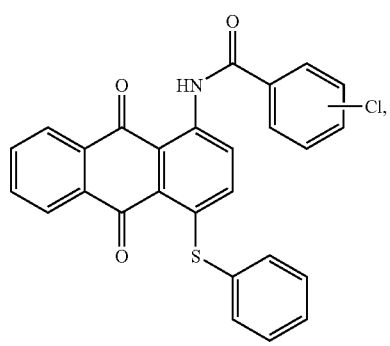
(5)
3. A composition according to claim 1, further comprising at least one red-dyeing dye of formulae (2a)-(2k)
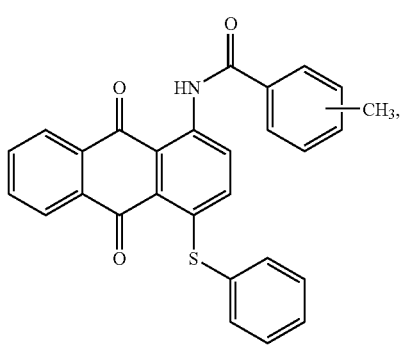
(2a)
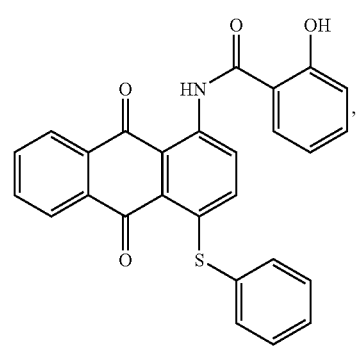
(2e)
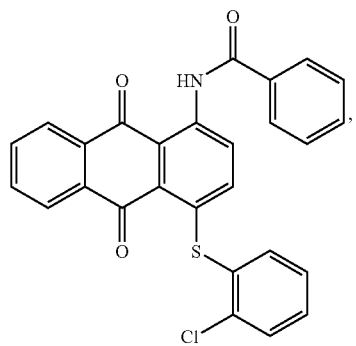
(2b)
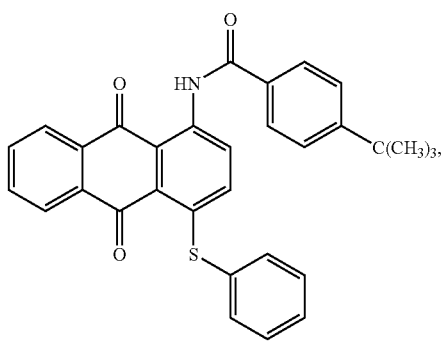
(2f)
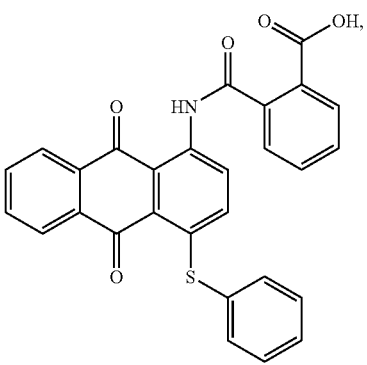
(2c)
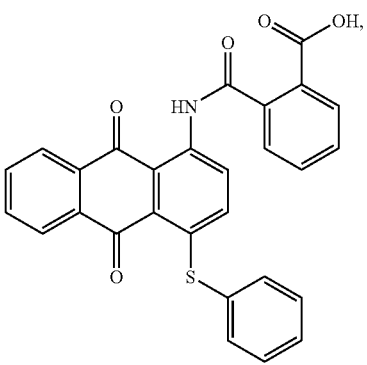
(2g)

-continued

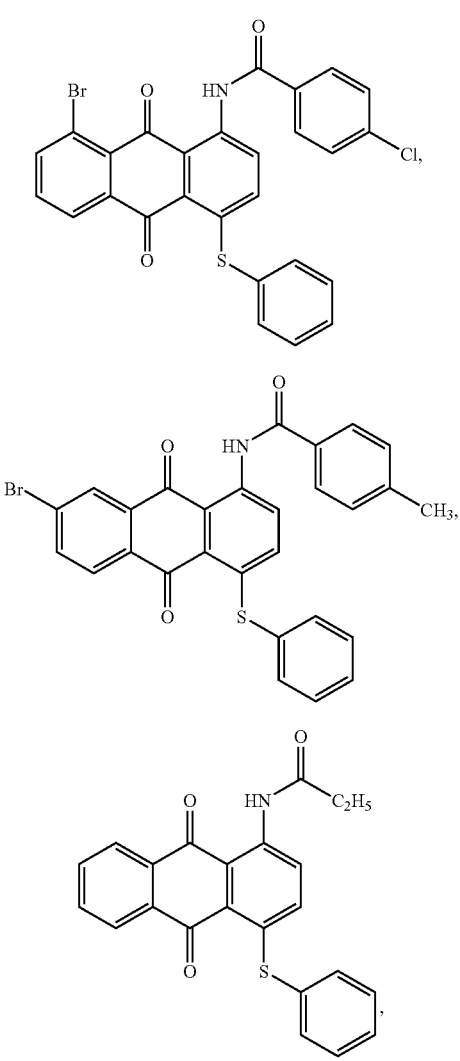

(2h)

(2i)

(2j)

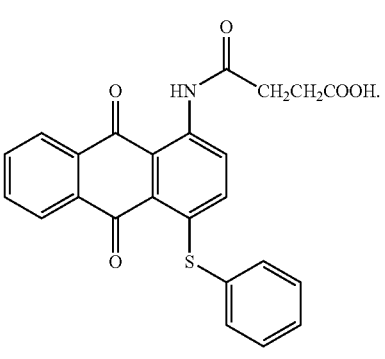

(2k)

and a yellow-dyeing dye of formula (6)

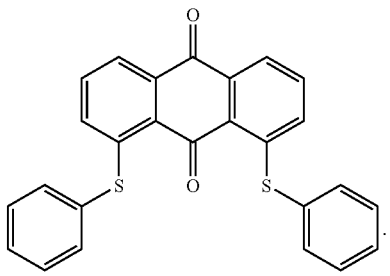

(6)

4. A method of dyeing or printing of semi-synthetic or synthetic hydrophobic fibre materials, which comprises contacting said materials with a tinctorially effective amount of a composition according to claim 1.

5. A method of producing coloured plastics or polymeric colour particles, which comprises incorporating a tinctorially effective amount of a composition according to claim 1 into said materials.

* * * * *